Figure 1:
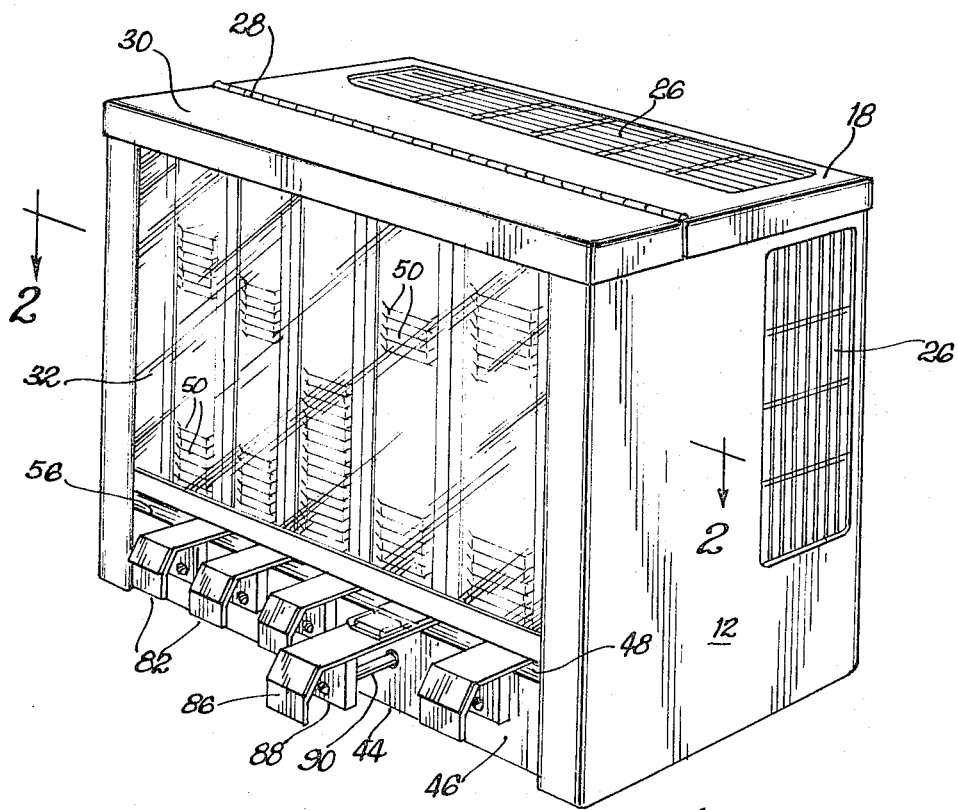

Nov. 7, 1967    L. H. CHANOCH ET AL    3,351,233
REFRIGERATED FOOD DISPENSER HAVING A RECIPROCATING EJECTOR
Filed Feb. 21, 1966                          2 Sheets-Sheet 1

INVENTORS
Lawrence H. Chanoch
Sidney Blumberg
by McDougall, Hersh, Scott and Ladd
Att'ys Nov. 7, 1967   L. H. CHANOCH ET AL   3,351,233
REFRIGERATED FOOD DISPENSER HAVING A RECIPROCATING EJECTOR
Filed Feb. 21, 1966                         2 Sheets-Sheet 2
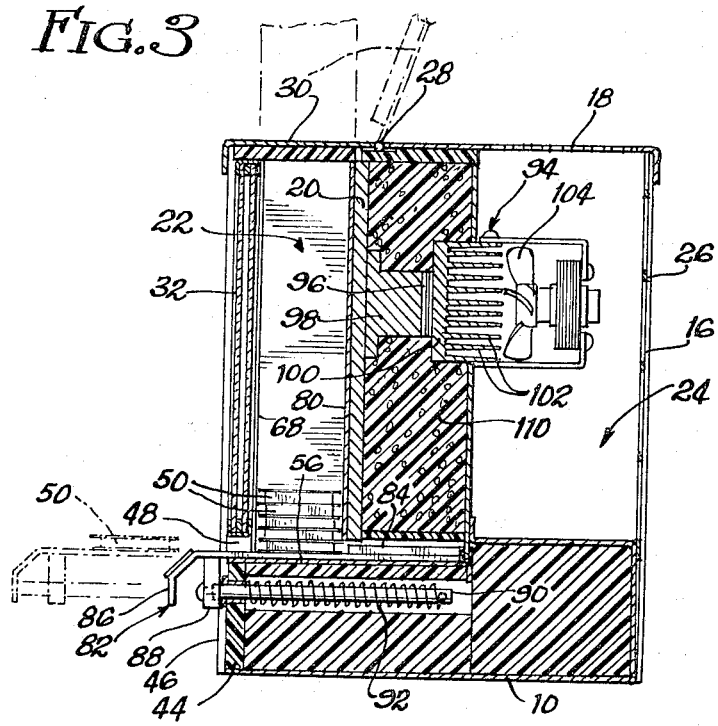
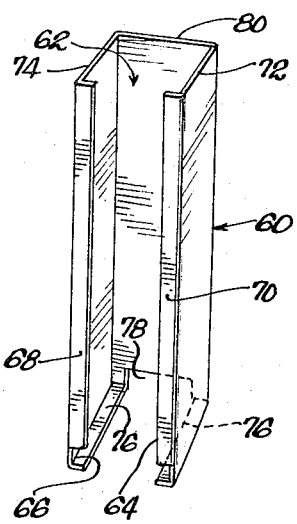
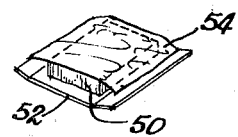
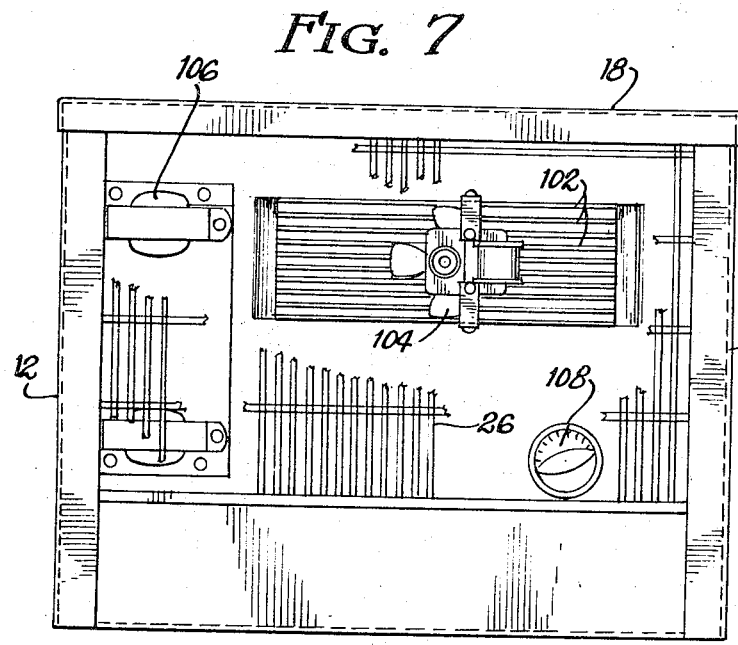
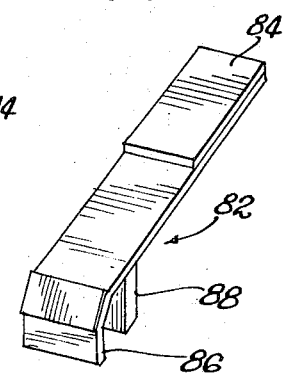
INVENTORS
Lawrence H. Chanoch
Sidney Blumberg
by McDougall, Hersh, Scott and Ladd
Attys

United States Patent Office 3,351,233
Patented Nov. 7, 1967

---

3,351,233
REFRIGERATED FOOD DISPENSER HAVING A RECIPROCATING EJECTOR
Lawrence H. Chanoch, 7641 Kilbourn Ave., Skokie, Ill. 60076, and Sidney Blumberg, 3440 N. Hollywood Ave., Chicago, Ill. 60645
Filed Feb. 21, 1966, Ser. No. 528,970
7 Claims. (Cl. 221—150)

This invention relates to a dispenser for refrigerated foods and it relates more particularly to a device for dispensing separated pats of butter and for maintaining a supply of such pats of butter in a refrigerated state for dispensing.

In the dispensing of foods, as in a cafeteria line, the butter is subdivided into pats positioned on a suitable pad of paperboard for handling and for maintaining their separated state. Such pats of butter are then tossed into a bowl or pan which is partially immersed in ice water with the intent of maintaining the butter in a refrigerated state. There are a number of obvious objections to the dispensing of food in this manner. In the first place, the pats of butter are in an uncovered container and therefore open to the atmosphere for possible contamination. In the second place, the pats of butter are handled not only by the person filling the container but also by many of the customers during removal for use or purchase. Thus the butter is open to widespread contamination and it is presented in an unsanitary state.

By way of further objection, it has been found that in normal practice, the ice in the water is often allowed to melt whereby the refrigerated state is not maintained. Under such conditions, the pats of butter are allowed to soften and the softened pats tend to stick one to another to raise further problems of separation and sanitation. Even in the absence of the melting of the ice, only a portion of the butter is cooled by the refrigeration so that the described softening and sticking will often occur in use.

Finally, in a cafeteria line, space is at a premium and it is desirable to maximize the amount of food that can be presented per unit space.

It is an object of this invention to produce a new and improved food dispenser and particularly a dispenser for pre-cut pats of butter in which the butter is maintained in an enclosure to provide sanitation and prevent contamination; in which the enclosure is a refrigerated enclosure for maintaining the butter in a refrigerated state; in which the pats of butter are separately dispensed from the container without access to the other pats for handling or contamination; in which the dispenser can be loaded with the pats of butter without need for handling; in which the pats of butter can be pre-cooled in a suitable container removably received within the dispenser to facilitate the loading of the dispenser and maintenance of the dispenser with sufficient pats of butter for dispensing; in which the dispenser is simple in construction and easy in operation for loading and unloading and for dispensing pats of butter; in which the refrigerated state can be maintained within the dispenser at minimum cost; in which the dispenser can be opened for access to the various parts for cleaning thereby to maintain the desired sanitary state, and in which the space occupied for the dispensing of butter is used most efficiently for maximum presentation in minimum space and in which such presentation is made in an attractive and appetizing manner.

These and other objects and advantages of this invention will hereinafter appear and for purposes of illustration, but not of limitation, an embodiment of the invention is shown in the accompanying drawings, in which—

Figure 2:
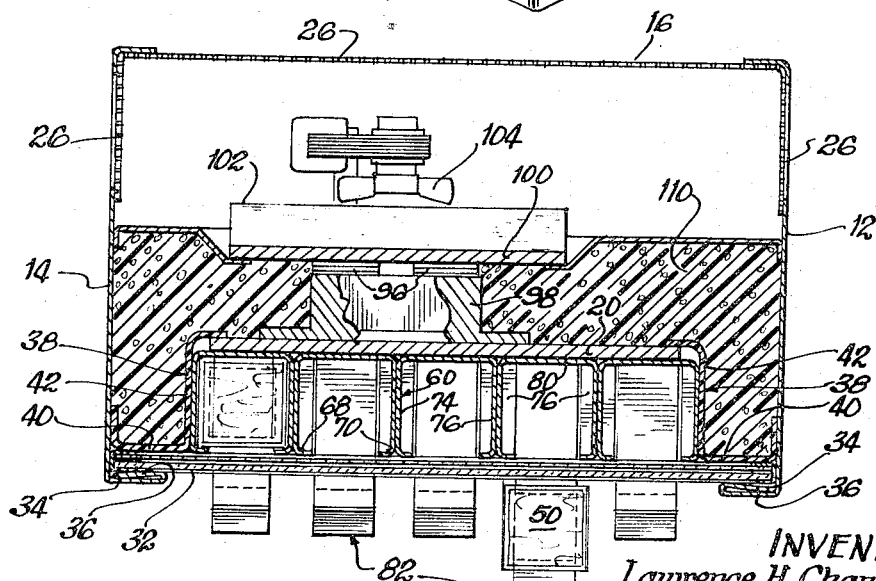

FIG. 1 is a perspective elevational view of a butter dispenser embodying the features of this invention;
FIG. 2 is a sectional view taken along the line 2—2 of FIG. 1;
FIG. 3 is a sectional view taken lengthwise through the dispenser;
FIG. 4 is a perspective elevational view of a loading chute employed in the dispenser of FIG. 1;
FIG. 5 is a perspective view of one of the pats of butter which is stacked in the chute for dispensing;
FIG. 6 is a perspective view of the slide actuator employed in the practice of this invention; and
FIG. 7 is an elevational view from the backside of the dispenser shown in FIG. 1.

Referring now to the drawings, the dispenser comprises a housing of substantially rectangular shape having a bottom wall 10, side walls 12 and 14, a back wall 16, and a top wall 18, with the interior of the housing being divided by a vertically disposed cold wall 20, extending crosswise of the housing into a front compartment 22 and a rear compartment 24.

The side, top and rear wall portions about the rear compartment are provided with openings or other grillwork 26 for communicating the interior of the compartment with the outside atmosphere for the passage of air therethrough.

The portion of the top wall 18 which overlies the front compartment 22 is separated from the remainder and is pivotally secured to the remainder along the hinged connection 28 for rocking movement of the wall portion 30 as a door between raised or open position, as illustrated by the broken lines in FIG. 3, and lowered or closed position, as indicated by the solid lines in FIGS. 1 and 3. Instead, the door can be employed as a removable lid.

The front compartment is adapted to be enclosed by a front wall in the form of a window 32, preferably of thermopane, which is mounted for vertical sliding movement within guides along the lateral edges to enable the window to be raised, when the door 30 is raised, for removal of the window for cleaning or for access into the interior of the front compartment 22. The lateral inwardly facing grooves 34, which serve as guides for the window, are formed, in the illustrated modification, by turning the forward end portion of the sheet metal forming the side walls perpendicularly inwardly to form one wall 36 of the groove 34. The other portion is provided by side plates 38 fixed to the side walls and having a portion 40 which extends crosswise and then a rearwardly extending portion 42 to define the side walls of the front compartment and in which the inner end of the side plate extends laterally inwardly to the lateral edges of the cold wall 20.

The housing is completed by a stationary base portion 44 having a front wall 46 which extends upwardly from the bottom for a distance short of the window to provide a slotted portion 48 therebetween dimensioned to have a height slightly greater than the height of the pat of butter 50 positioned on the supporting pad 52 and covered by a protective film 54. The upper end of the base portion defines a horizontally disposed platform 56 which extends rearwardly from the upper edge of the front wall to define the bottom wall of the front compartment 22.

Vertically disposed within the front compartment 22 are a plurality of chutes 60 in the form of rectangularly shaped tubular members which are open at the top 62 with the passage extending lengthwise through the tubular member being dimensioned to correspond to the dimension of the pad 52 supporting the pat of butter 50 so that a large number of such assemblies can be stacked one upon the other in the chute with the film 54 separating the pats one from the other.

The front wall 64 of the chute 60 is cut out across its lower edge portion for a length greater than the height of one pat but less than two so as to enable the lowermost of the pats of butter stacked in the chute to be displaced forwardly from the chute through the slot 66 for dispensing. In the preferred construction of the chutes, as illustrated in FIG. 4, the front wall is omitted to enable full observation of the entire stack of butter pats in the chute through the window 32 so as to indicate whether or not the pat chute is empty. The front wall is replaced by abutments in the form of flanges 68 and 70 turned inwardly from the forward end portions of the side walls 72 and 74 to provide abutments which operate to hold the pats of butter in the chute. Similarly, the bottom wall can be eliminated and replaced by flanges 76 turned inwardly from the lower edges of the side walls to provide bottom supports on which the stack of pats rest. A slotted portion 78 is also provided in the lower end portion of the back wall 80 in endwise alignment with the slot 66 to enable a slide 82 to be displaced therethrough with an abutment 84 extending upwardly from the top surface of the slide for a distance less than the height of a pat of butter in the stack.

The front compartment 22 is dimensioned to have a height corresponding to the height of the chutes, a depth corresponding to the depth of the chutes, and a width corresponding to the width of one and preferably a multiple of said chutes to enable the chutes individually to be received within said front compartment in side by side relationship with the outer sides of the outermost chutes slidably engaging the side plates 42 while the back sides of each of the chutes slidably engage the front of the cold wall 20 for the transfer of cold therethrough. In the illustrated modification, the front compartment is dimensioned slidably to receive five such chutes in side by side relationship. However, it will be understood that space for as little as one or more than five chutes may be provided, without departing from the spirit of the invention.

An elongate slide plate 82 is provided for each chute in which the slide plate is dimensioned to have a width less than the width of the chute and preferably slightly less than the width of the slot 66 and a length which is greater than the depth of the chute to provide a portion extending rearwardly beyond the chute having an abutment 84 extending upwardly from the surface of the slide for a distance less than the height of a pat of butter but less than the height of the slot 78 and a width less than the slot 78 so as to enable the abutment to be displaced lengthwise through the slot into engagement with the lowermost pats of butter in the stack for forward displacement thereof from the stack in response to forward displacement of the slide from retracted to dispensing position.

Means are provided on the forward end portion of the slide 82 which extends forwardly beyond the front wall 46 for engagement to effect operation of the slide forwardly to dispensing position. Such means are illustrated in the drawings as a downwardly turned handle portion 86 at the forward end of the slide. Means are also provided constantly to urge the slide rearwardly towards retracted or normal position with the abutment 84 disposed rearwardly of the chute in endwise alignment with the lowermost pat of butter in the stack. For this purpose, each slide plate is provided with a block 88 depending from the underside with an elongate pin 90 extending rearwardly from the block through an opening in the front wall 46 and into the housing with a compression spring 92 disposed about the pin between the front wall 44 and a stop on the rearward end portion of the pin whereby the spring becomes compressed responsive to forward displacement of the slide constantly to urge the slide towards retracted position.

A compact structure is capable of being achieved with sufficient and controlled cooling when use is made of a thermoelectric module 94 formed of the usual hot and cold junctions 96 which develop a temperature differential in response to electrical input. The junctions are arranged with the cold junction facing forwardly for engagement with a metal block 98 of high heat conductivity which bears against the backside of the cold wall 20 for the conduction of cold from the thermoelectric unit. The hot side is engaged by a metal block 100 having fins 102 extending rearwardly into the rear compartment and which is provided with a motor driven fan 104 for inducing a flow of air onto the fins for the removal of heat. The thermoplastic cooling system includes a power supply 106 and a thermostat with control 108 for adjustment of the temperature in response to a thermocouple located in the front compartment.

The area within the housing between the side walls 12 and the plate 38 and the block 20 is filled with thermal insulating material 110, as by means of a foamed-in-place plastic, to reduce the heat loss into the cold side junction of the thermoelectric module as well as the cold plate 20 and the connecting block 98. The area surrounding the cold plate, the connecting block and the cold side of the thermoelectric unit is also enclosed within thermal insulating material to reduce heat gain.

Having described the basic construction of the food dispenser, description will now be made of the operation thereof.

The pats of butter 50 are made available from the supply source in stacks housed within cartons which can be directly inserted into the chute through the open end at the top to insert the stacks of butter pats within the chute. Thereafter the carton can be displaced endwise for removal from the chute, leaving the pats of butter in stacked relationship in the chute with the bottommost pat at rest on the support 76.

Any number of such chutes can be filled with excess replacement units stored in a refrigerator while the required number are lowered into the front compartment of the dispenser. When the number of chutes to fill the dispenser has been inserted, the door 30 is lowered to closed position. In the meantime the thermoelectric module has been set for operation and adjusted to effect the desired refrigerated temperature within the front compartment.

When it is desired to effect removal of a pat of butter, the purchaser merely pulls the slide 82 forwardly from a chute in which pats of butter are stacked, as can be seen through the window 32. In response to the forward displacement of the slide, the abutment 84 is displaced forwardly through the slot 78 and into engagement with the back side of the pad 52 to effect displacement of the lowermost pat in the stack. The pat of butter is displaced forwardly with the slide for passage beneath the window 32 to the outside where the operator can remove the pat from the slide.

Upon release of the slide, the tensioned coil spring 92 operates to effect return of the slide to retracted or normal position whereby the stack of butter pats drops one increment onto the bottom support as the abutment 84 clears the stack. Since the stack rides on the abutment during displacement through the chute, it is desirable for the abutment to constitute a flat plate to enable the relative sliding movement therebetween.

As previously described, the pat of butter 50 is located on a pad 52 of paperboard of greater dimension all around than the pat of butter but with only the portions extending laterally turned upwardly so that the slide-abutment 84 will normally engage the upturned edges of the paperboard to effect displacement.

When a chute has been emptied, it can be removed by opening the door and sliding the chute upwardly either for refilling or for replacement by a filled chute which has been stored as a spare in a refrigerated zone.

At the end of the day or after a period of use, the door can be raised and the front window 32 removed for complete access to the interior of the food storage space for a thorough cleaning to maintain sanitary conditions.

It will be apparent that we have provided a new and improved refrigerated food dispensing device in which maximum utilization is made of space for the display of the food product and in which the food product is presented in a most attractive and sanitary condition and whereby the product can be dispensed without previous handling by others.

It will be understood that changes may be made in the details of construction, arrangement and operation without departing from the spirit of the invention, especially as defined in the following claims.

We claim:

1. In a refrigerated device for the display and dispensing of food products arranged in the form of flat pads, an elongate chute having a cross-sectional dimension slightly greater than the cross-sectional dimension of the pads for receiving a plurality of pads stacked one on the other therein, said chute being formed with front, side and back walls and portions extending horizontally inwardly from the lower ends of the side walls to define a bottom wall on which the lowermost pad of the stack rests with the inwardly extending portions terminating short of one another to provide a slot therebetween, a slot in the front wall dimensioned to have a width slightly greater than the width of the pads and extending upwardly from the bottom wall for a distance greater than the height of one pad but less than the height of two to enable a single lowermost pad in the stack to be displaced forwardly over the bottom wall for passage therethrough, another slot in the back wall in lengthwise alignment with the slot in the front wall and extending upwardly from the bottom wall, a housing, a front compartment in the housing dimensioned removably to receive a chute therein in vertical position, an elongate slide mounted in the housing for longitudinal movement between retracted and operated positions with an intermediate portion of the slide operative in the slot of the bottom wall substantially flush with the bottom wall, said slide being dimensioned to have a length greater than the depth of the chute to provide a forward handle portion extending forwardly of the housing and a trailing portion extending rearwardly of the chute when in retracted position, an abutment extending upwardly from the portion of the slide rearwardly of the chute dimensioned to have a width less than the width of the rear slot and a height less than the height of the rear slot to enable displacement of the abutment forwardly with the slide through the slot for engagement with the lowermost pad in the stack, an opening in the housing above the slide dimensioned to have a height greater than one pad to enable the pad to be displaced with the slide to the outside of the housing, means constantly urging the slide toward retracted position, and refrigeration means for cooling the front compartment comprising a wall formed of high heat conductive material in heat transfer relation with the back wall of the front compartment and a thermoelectric module mounted with its cold junction in heat conductive relationship with said heat conductive wall.

2. A device as claimed in claim 1 in which the front compartment is dimensioned to have a depth corresponding to the chute and a width corresponding to a multiple of the width of the chute for receiving said multiple of chutes in side by side relationship therein.

3. A device as claimed in claim 1 in which the housing has a front wall in the form of a window for observation into the front compartment.

4. A device as claimed in claim 1 in which the thermoelectric module and the front compartment are surrounded with thermal insulating material.

5. A device as claimed in claim 1 in which the food product dispensed in the refrigerated device comprises pats of butter.

6. A device as claimed in claim 1 in which the means constantly urging the slide toward retracted position comprises an abutment depending from a portion of the slide forwardly of the housing, an elongate rod fixed to the abutment and extending rearwardly therefrom in substantially parallel relation with the slide for movement with the slide, a coil spring about the rod and fixed at one end to the rearward end portion of the rod with the remainder axially slidable relative to the rod and a fixed stop in advance of the forward end portion of the coil spring for tensioning the coil spring responsive to forward displacement of the slide thereby constantly to urge the slide and rod toward retracted position.

7. A device as claimed in claim 1 in which the intermediate portion of the slide is dimensioned to have a width corresponding to the width of the slot in the bottom wall to form a part of the bottom wall of the chute when the latter is in position of use in the housing.

References Cited

UNITED STATES PATENTS

| | | | |
|---|---|---|---|
| 593,132 | 11/1897 | Spiro | 221—197 X |
| 716,507 | 12/1902 | Williams | 221—198 X |
| 785,883 | 3/1905 | Honabarger | 221—155 X |
| 1,170,705 | 2/1916 | Swift | 221—276 X |
| 1,379,524 | 5/1921 | Cassell | 221—131 |
| 1,706,324 | 3/1929 | Rodgers | 221—155 X |
| 1,947,322 | 2/1934 | Wachs et al. | 221—131 X |
| 1,951,746 | 3/1934 | Bonaccolta et al. | 221—150 X |
| 2,201,464 | 5/1940 | Wood | 221—150 |
| 2,399,612 | 5/1946 | Auerbach | 221—131 |
| 2,560,327 | 7/1951 | Bergman | 221—276 |
| 3,251,188 | 5/1966 | Dean et al. | 62—3 |

WALTER SOBIN, *Primary Examiner.*